US011204599B2

(12) United States Patent
Ashworth et al.

(10) Patent No.: US 11,204,599 B2
(45) Date of Patent: Dec. 21, 2021

(54) SYSTEMS AND METHODS FOR CULLING STRUCTURAL MEMBERS

(71) Applicant: House of Design LLC, Nampa, ID (US)

(72) Inventors: Peter Okko Ashworth, Nampa, ID (US); Shane Christopher Dittrich, Nampa, ID (US); Kristopher Ryan Okelberry, Nampa, ID (US); Christian Rivas, Nampa, ID (US); Oscar Williamson, Nampa, ID (US)

(73) Assignee: House of Design LLC, Nampa, ID (US)

( * ) Notice: Subject to any disclaimer, the term of this patent is extended or adjusted under 35 U.S.C. 154(b) by 0 days.

(21) Appl. No.: 16/882,314

(22) Filed: May 22, 2020

(65) Prior Publication Data

US 2020/0379448 A1 Dec. 3, 2020

Related U.S. Application Data

(60) Provisional application No. 62/855,680, filed on May 31, 2019.

(51) Int. Cl.
*G05B 19/418* (2006.01)

(52) U.S. Cl.
CPC ... *G05B 19/41805* (2013.01); *G05B 19/4183* (2013.01); *G05B 19/41815* (2013.01); *G05B 19/41865* (2013.01)

(58) Field of Classification Search
CPC ........ G05B 19/41805; G05B 19/41815; G05B 19/41865; G05B 19/4183; B27B 31/06; G01N 21/8986
See application file for complete search history.

(56) References Cited

U.S. PATENT DOCUMENTS

| | | | |
|---|---|---|---|
| 10,580,126 B1 * | 3/2020 | Weinschenk | B07C 5/14 |
| 2010/0188500 A1 * | 7/2010 | Bouchard | G01N 21/8901 348/93 |
| 2016/0103115 A1 * | 4/2016 | Hamby | G01N 21/95 73/618 |

FOREIGN PATENT DOCUMENTS

CN 207379464 U * 5/2018

* cited by examiner

*Primary Examiner* — Christopher E. Everett
(74) *Attorney, Agent, or Firm* — Stoel Rives LLP; R. Whitney Johnson (57) ABSTRACT

A lumber culling system may include a carriage with a distal wall and a proximal wall spaced apart from one another to form an interior of the carriage. An aperture may extend through the distal wall and the proximal wall. The aperture is sized and shaped to allow a board of wood to pass through the distal wall and the proximal wall. Further, the interior of the carriage is visible within the aperture. Imaging equipment may be disposed within the interior of the carriage and arranged to scan a portion of each side of the board of wood that is positioned within the aperture. The carriage may be moved along a length of the board of wood while the board of wood is at rest on static datum supports.

19 Claims, 8 Drawing Sheets

SYSTEMS AND METHODS FOR CULLING STRUCTURAL MEMBERS

RELATED APPLICATIONS

This application claims priority to U.S. Provisional Application No. 62/855,680, filed May 31, 2019 and entitled SYSTEMS AND METHODS FOR CULLING STRUCTURAL MEMBERS, which is hereby incorporated by reference herein in its entirety.

TECHNICAL FIELD

The present disclosure relates generally to the field of assembling structural components, and more particularly to systems and methods for inspecting wood boards for use in structural components, such as a truss, a frame member, etc., for building construction.

BACKGROUND

A structural component, such as a truss, may be formed using an assembly of beams. Some structural components use wood boards for the beams. Wood boards feature variances that make each wood board unique. The variances in the individual wood boards can affect the shape, visual appearance, and integrity of an assembled structural component.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Structural components, such as wall frames, partition frames, trusses, etc., are often assembled at a factory. Factory assembly provides a number of advantages, including consistency of product and speed and/or efficiency of production. Some structural components are assembled from a plurality of wood boards. Wood boards however are not perfectly consistent. Some wood boards include flaws, such as a bow, a twist, a cup, a wane, a split, and a knot. While flaws affect the shape, visual appearance, and integrity of the individual wood board, a flaw in a single wooden board can affect the manufacturing, the shape, the visual appearance, and the integrity of an assembled structural component.

As used herein, the term "structural member" refers to a member to be used to construct a structure such as a building or other structure. For example, a structural member may be used to construct a truss, which in turn may serve in construction of homes, other buildings, bridges, or other structures. In such examples, a structural member may include a truss member.

Moreover, the phrases "connected to" and "coupled to" are used herein in their ordinary sense, and are broad enough to refer to any suitable coupling or other form of interaction between two or more entities, including mechanical, fluid, and thermal interaction. Two components may be coupled to each other even though they are not in direct contact with each other. The phrase "attached to" refers to interaction between two or more entities which are in direct contact with each other and/or are separated from each other only by a fastener of any suitable variety (e.g., an adhesive, stitching, etc.).

The terms "a" and "an" can be described as one, but not limited to one. For example, although the disclosure may recite an element having, e.g., "a support member," the disclosure also contemplates that the element can have two or more support members.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment. Not every embodiment is shown in the accompanying illustrations, however, at least a preferred embodiment is shown. At least some of the features described for a shown preferred embodiment are present in other embodiments.

In the following detailed description, reference is made to the drawings. In some instances, like reference numerals are used in the various drawings to indicate similar elements. It will be understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Figure 1:
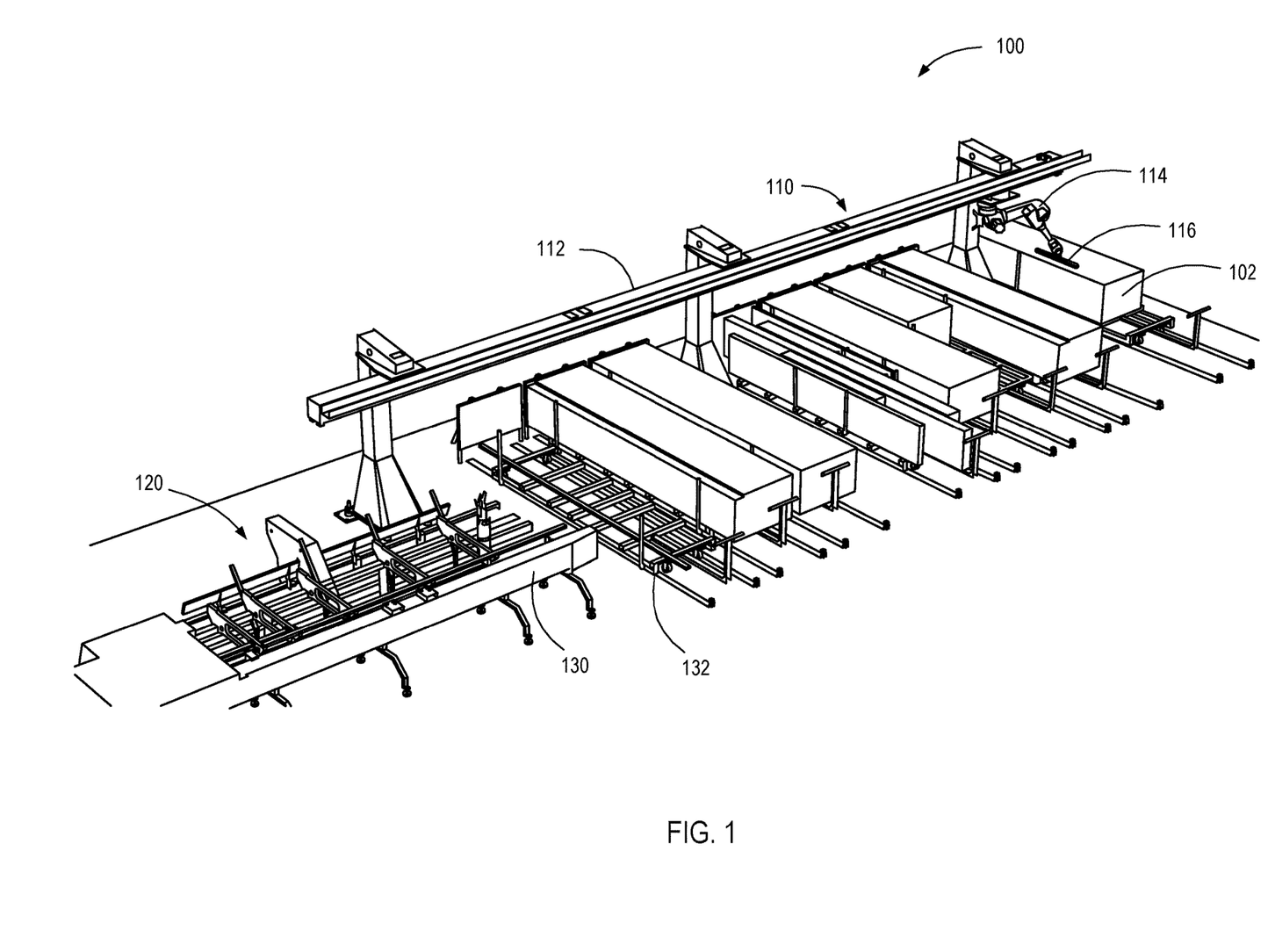
FIG. 1 is a perspective view of a lumber culling system, in accordance with one embodiment.

FIG. 1 is a perspective view of a lumber culling system 100 in accordance with one embodiment. In the illustrated embodiment, the lumber culling system 100 comprises an infeed system 110 and a scanning system 120. The lumber culling system 100 inspects structural members to determine flaws. Based on the flaws of an inspected structural member, the lumber culling system 100 determines whether the inspected structural member meets target criteria set to be used in downstream equipment 130.

In the illustrated embodiment, the infeed system 110 comprises a robotic arm 114 and a track 112. The robotic arm 114 may move along the track 112 and pick up structural members using a securing mechanism 116 at the end of the robotic arm 114. In some embodiments, picking up a structural member with the robotic arm 114 includes suctioning the structural member with a vacuum system of the securing mechanism 116. In some embodiments, picking up the structural member with the robotic arm 114 includes gripping the structural member with a gripping member of the securing mechanism 116.

The infeed system 110 is configured to move structural members from one or more bunks (e.g., supply bunk 102) to the scanning system 120. The bunks hold structural members. In some embodiments, the bunks may contain different sizes of structural members and the infeed system 110 may determine the bunk from which to grab a structural member based on the size of the structural member held by the bunk. The robotic arm 114 moves along the track 112 to position itself near a supply bunk 102. The robotic arm 114 engages and secures the securing mechanism 116 to a structural member from the supply bunk 102 and lifts the structural member from the supply bunk 102. The robotic arm 114 rotates the structural member in line with the scanning system 120. The robotic arm 114 moves along the track 112 to a position near the scanning system 120 and places the structural member into the scanning system 120.

After the robotic arm 114 has placed a structural member into the scanning system 120, the robotic arm may retrieve another structural member. If the scanning system 120 is empty (e.g., a previously placed structural member has been removed), the robotic arm 114 may place a new structural member into the scanning system 120. If the scanning system 120 is already inspecting a structural member, the robotic arm 114 places the new structural member into a buffer which comprises a support member for the new structural member to rest on while waiting for the scanning system 120 to finish scanning the previously placed structural member.

The scanning system 120 is configured to inspect a structural member. The scanning system 120 captures image data of the structural member and uses the image data to determine defects. The scanning system 120 may compare parameters of the structural member to a target set of criteria. The target set of criteria form a target specification for the lumber culling system to determine whether to use or discard a structural member.

Based on the results from the comparison by the scanning system 120, the lumber culling system 100 may determine how to use an inspected structural member. For example, if the structural member satisfies the target set of parameters, the robotic arm 114 picks the structural member out of the scanning system 120 and places the structural member into downstream equipment 130. If the lumber culling system 100 determines that one or more parameters of the structural member are outside of the target specification, the robotic arm 114 may pick up the structural member from the scanning system 120 and place the structural member into a discard bunk 132.

Additionally, in some embodiments, the lumber culling system 100 may determine a preferred orientation of the structural member for placement into the downstream equipment. For example, the robotic arm 114 may rotate the structural member to an desirable face when it places the structural member into the downstream equipment 130. The robotic arm 114 may also maintain the orientation of the structural member based on the determined preferred orientation. The preferred orientation may be based on a number of visual defects on a given face or the direction of any bowing, twisting, cupping, or waning of a given face. For example, if a structural member features a split or a knot that is small enough to be within a target specification (e.g., set of target criteria) on a first face and no knots or cracks on a second face, the robotic arm 114 may position the structural member in the downstream equipment 130 with the second face up. In some embodiments, the lumber culling system 100 may identify a position within a truss that the structural member should use.

The downstream equipment 130 may include one or more of a variety of equipment. For example, in some embodiments, the downstream equipment 130 may be a saw. In some embodiments, the downstream equipment 130 may be a planar. In some embodiments, the downstream equipment 130 may assemble the structural members into a truss. In some embodiments, the downstream equipment 130 may plate the structural members.

Figure 2:
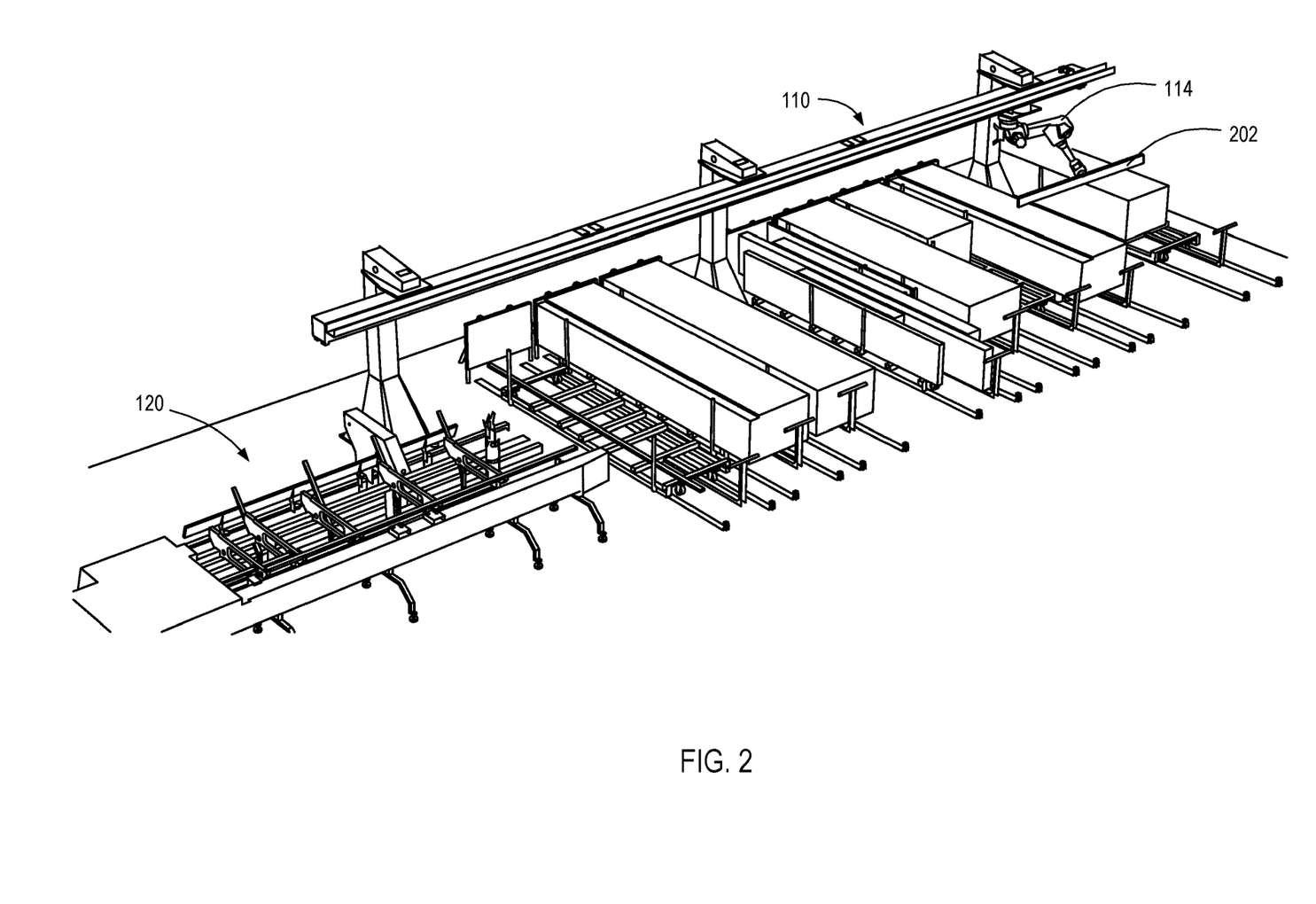
FIG. 2 illustrates an infeed system of FIG. 1 moving a structural member to a scanning system.

FIG. 2 illustrates the infeed system 110 of FIG. 1 moving a structural member 202 to the scanning system 120. As shown, the robotic arm 114 lifts and rotates the structural member 202. The robotic arm 114 moves along the track while holding the structural member 202 to transport the structural member 202 to the scanning system 120.

In some embodiments, the robotic arm 114 rotates the structural member 202 along multiple axes of the structural member 202. The robotic arm 114 may be configured to rotate the structural member 202 around a longitudinal axis, where the longitudinal axis runs along the lengthwise direction of the structural member 202. The robotic arm 114 may also be configured to move the structural member 202 around a vertical axis, where the vertical axis runs vertically through the structural member 202, perpendicular to the longitudinal axis. In some embodiments, the robotic arm 114 lifts the structural member 202 and then rotates the structural member 202 by about 90 degrees around the longitudinal axis of the structural member 202 such that a width of the structural member 202 is in line with gravity. The robotic arm 114 may also rotate the structural member 202 around the vertical axis by about 90 degrees such that the structural member 202 is parallel to the track 112 of the infeed system 110.

Thus, the robotic arm 114 may transport the structural member 202 to the scanning system 120 in a position where an edge of the structural member 202, rather than a face, is facing downwards and the structural member is parallel to the track. The structural member 202 comprises two edges and two faces where the two edges are the two narrow sides along the length of the board and the two faces are the two wide sides along the length of the board. By positioning the structural member 202 such that the faces of the structural member 202 are in line with gravity, the robotic arm 114 may limit sagging (e.g. bowing due to gravity at the ends) of the structural member 202 while moving the structural member 202 to the scanning system 120. If the structural member 202 were carried with a face (e.g., a wider side) facing downward, the structural member 202 could bend due to length of the structural member 202 and gravity acting on the ends of the structural member 202, which may limit vertical clearance between the structural member 202 and any obstacles between the bunk and the scanning system 120.

Figure 3:
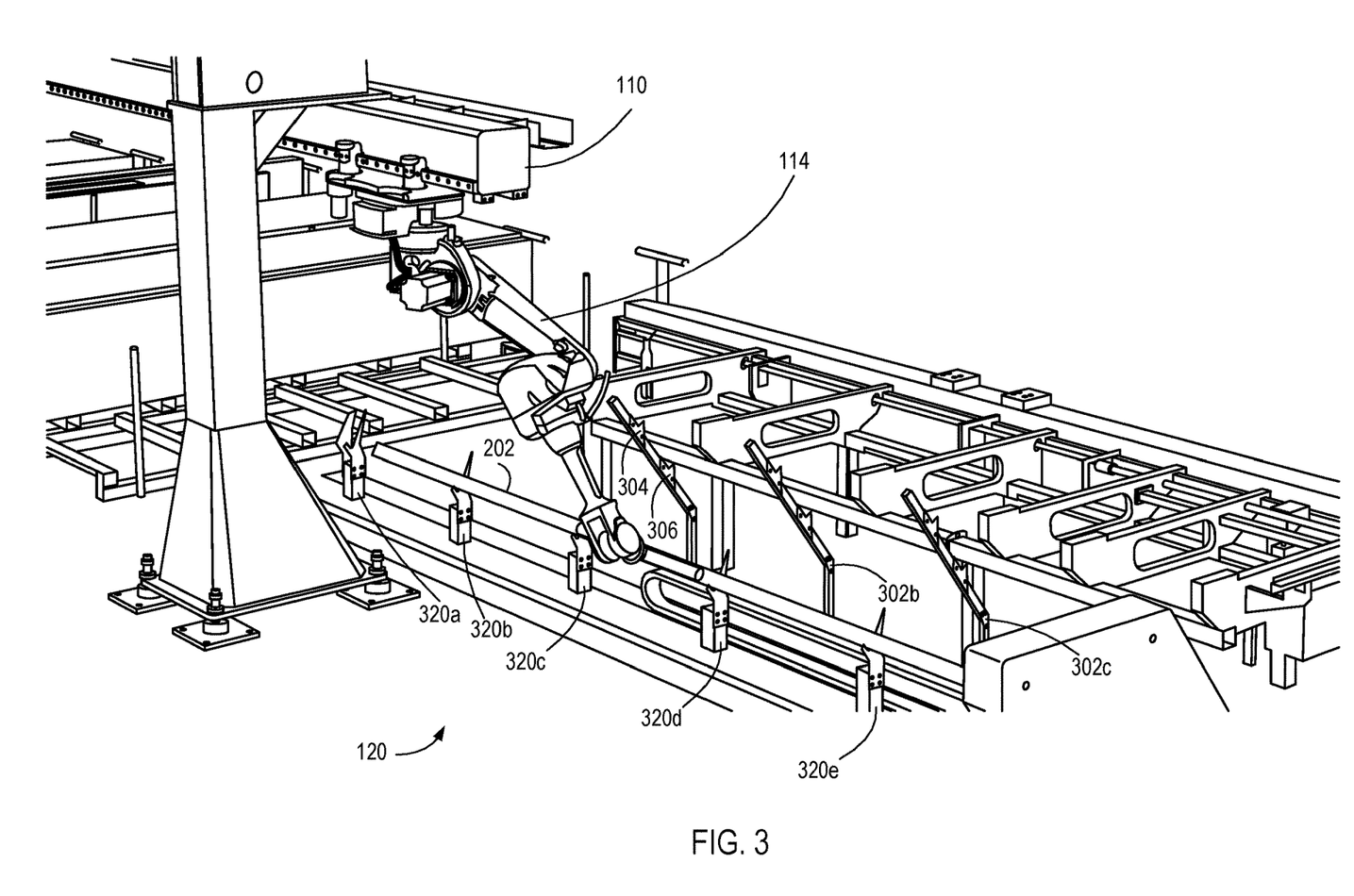
FIG. 3 illustrates the infeed system of FIG. 1 placing the structural member into the scanning system.

FIG. 3 illustrates the infeed system 110 of FIG. 1 placing the structural member 202 into the scanning system 120. As shown, the scanning system 120 may comprise one or more datum members (e.g., a first datum member 320a, a second datum member 320b, a third datum member 320c, a fourth datum member 320d, and a fifth datum member 320e (referred to herein generally and collectively as datum members 320)).

The datum members 320 are a plurality of supports to hold a structural member 202 during scanning. The robotic arm 114 may place the structural member 202 on the datum members 320 at an angle. The datum members 320 may include an angled surface to ensure that once the robot releases the structural member 202, the structural member 202 is able to slide to rest on a fixed datum surface. In some embodiments, the datum surface of the datum members 320 may be a known bottom point such that the datum members 320 support the structural member 202 in a known position. In some embodiments, a known bottom point or known position is not necessary, and the scanning system 120 can measure independently of the datum members 320.

The scanning system 120 moves along the structural member 202 as the robotic arm 114 moves to pick up another structural member. If the scanning system 120 is not complete with its scan of the structural member 202 when the robotic arm 114 returns with a new structural member, the robotic arm 114 may place the new structural member onto buffer support 302a, buffer support 302b, and buffer support 302c (herein collectively referred to as buffer area 302) to wait for the scanning system 120 to finish scanning the structural member 202. The buffer area 302 may include multiple cantilevers (e.g., first cantilever 304 and second cantilever 306) to support multiple structural members in the buffer area 302.

Figure 4:
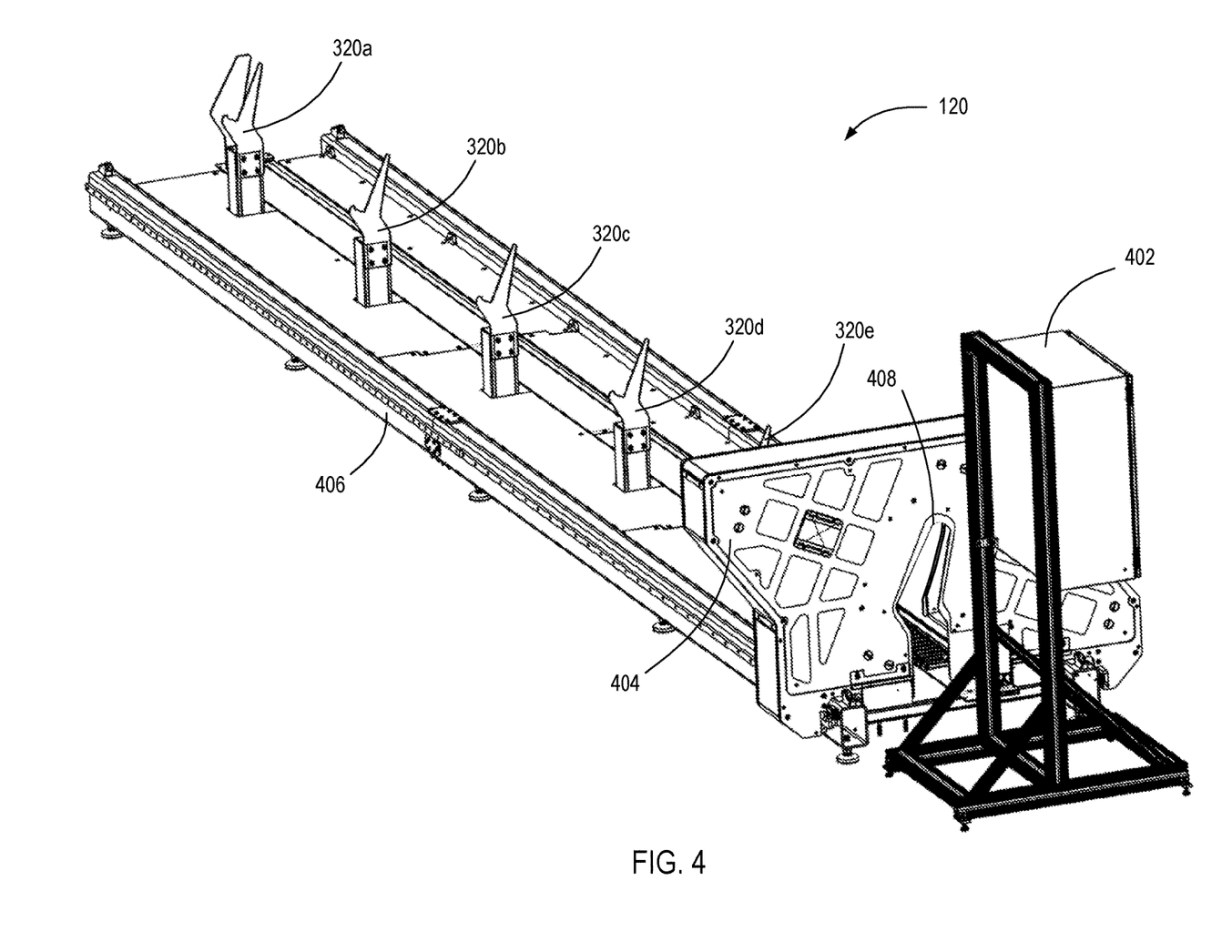
FIG. 4 is a perspective view of the scanning system of FIG. 1.

FIG. 4 illustrates a perspective view of the scanning system 120 of FIG. 1. In the illustrated embodiment, the scanning system comprises an electronics cabinet 402, a carriage 404, datum members 320, and a rail assembly 406. The scanning system 120 captures three-dimensional and two-dimensional data of a structural member placed on the datum members 320 and determines whether the structural member meets a target specification.

The carriage 404 includes a housing with a distal wall and a proximal wall spaced apart from one another to form an interior of the housing. An aperture 408 extends through the distal wall and the proximal wall. The aperture 408 is sized and shaped to allow a structural member to pass through the distal wall and the proximal wall. Additionally, the sides of the aperture 408 are open to the interior of the carriage 404 such that the interior of the housing is visible within the aperture. As shown, the aperture 408 extends through a bottom edge of the carriage 404 to allow the carriage 404 to pass over the datum members 320. The aperture 408 may be sized and shaped to fit around a variety of sizes of structural members without the need for mechanical changes.

The carriage 404 includes image capture devices to capture image data of a portion of a structural member within the aperture 408. For example, in some embodiments, the image capture devices scan a portion of each side of the structural member that is positioned within the aperture. The image capture devices may include four two-dimensional cameras positioned to capture optical image data of the portion of each side of the structural member within the aperture, and four three-dimensional cameras positioned to capture three-dimensional image data of the portion of each side of the structural member within the aperture. For example, the three-dimensional cameras may capture a height of the surface of the structural member.

The carriage 404 moves along the rail assembly 406 to pass the aperture 408 along the length of the structural member and scan each side of the structural member. The structural member and datum members 320 may remain static while the carriage 404 moves to perform the scan. In some embodiments, the carriage 404 may include an encoder to track speed and position of the housing. In the illustrated embodiment, the rail assembly 306 includes two rails. In other embodiments, the number of rails may vary, for example, the rail assembly 306 may include one or more rails. A conveyance, such as a motor, may move the housing along the rail assembly.

The electronics cabinet 402 houses a controller which may include a central processing unit (CPU), a microcontroller, a programmable logic controller (PLC), a field programmable gate array (FPGA), another programmable device, or combinations thereof. The controller is configured to control one or more aspects of operation of one or more of the motor of the carriage 404, the image capture devices, and the robotic arm of the infeed system.

For example, the controller may be configured to at least partially control motion of one or more of the infeed robot 106, the plate picking robot 110, the press loading robot 126, or the outfeed robot 120. For example, the controller may receive image data and identify characteristics of the structural member based on the optical image data, the characteristics may include one or more of texture, knots, cracks, and grain. The controller may compare the characteristics to target criteria to determine how the structural member should be processed. If the characteristics do not meet the target criteria, the controller indicates that the board of wood is to be discarded and may transmit a signal to the robotic arm to move the structural member to a discard bunk. If the characteristics meet the target criteria, the processing unit indicates that the board of wood is to be used and may transmit a signal to the robotic arm to move the structural member to downstream equipment. In some embodiments, the controller may further determine an orientation of the board of wood for downstream equipment based on the flaws of the structural member. For example, the controller may indicate to the robotic arm to rotate the structural member along a longitudinal axis for use in downstream equipment.

In some embodiments, the controller may generate models of the structural member based on the image data. For example, the controller may generate a height map based on the three-dimensional image data captured by the four three-dimensional cameras, and determine flaws in the structural member based on the height map and the three-dimensional image data.

The controller may use the image data to detect a number of flaws. For example, the controller may detect a bow in the structural member by comparing height (extracted from the three-dimensional image data) of the face of the structural member along its length. Similarly, the controller may detect a bow in the structural member by determining angling at both ends of the structural member using the three-dimensional image data and comparing the angles of the ends. The controller may detect cupping by analyzing the three-dimensional image data along a short axis of the structural member. Additionally, a crook or wane may be detected using the height data from the three-dimensional image data along an edge of the structural member. The three-dimensional image data may also be used to determine dimensions of the structural support. Further, the controller may use artificial intelligence to determine flaws from the two-dimensional data. For example, an artificial intelligence program may be trained to identify cosmetic characteristics of the structural member such as texture, knots, splits, and grain.

In some embodiments, the controller includes one or more processors and one or more data storage devices (hereinafter referred to as "storage"). The storage may include nonvolatile storage (e.g., flash memory, a hard disk drive, a solid state drive, etc.), volatile storage (e.g., random access memory (RAM), etc.) or combinations thereof. The storage may, in some embodiments, include computer-readable instructions stored thereon. The computer-readable instructions are configured to instruct the processors to receive image data of a structural member, determine flaws using the image data, determine if parameters of the structural member are within a target specification, and control a robot to move the structural member to either a discard pile if the structural member is outside of the target specification or downstream equipment if the structural member is within the target specification.

The storage may also be configured to store information that is useful for operating the scanning system 120. For example, the storage may be configured to store image data, a description of flaws of the structural member, and models of the structural member.

The scanning system 120 may operate by scanning a board and then analyzing the resulting image using three-dimensional image processing software and artificial intelligence two-dimensional image processing software. In some embodiments, the scan occurs when an encoder sends pulses that trigger all cameras (two-dimensional and three-dimensional) as the carriage moves. Each trigger scans a single line of pixels that may be stitched together using the software to form a two-dimensional image of the board being scanned.

In some embodiments, all four sides of the board are scanned as a separate image from each of the cameras. The three-dimensional cameras acquire an image that is used to create a "height map" meaning that warping, holes, cracks and wane are captured and can be analyzed by the controller. The two-dimensional cameras create an image that reflects the cosmetic state of the board, meaning that it captures texture, knots, cracks and grain of the board.

In some embodiments, the two-dimensional cameras can use infrared (IR) light at 850 nm wavelength to capture the image while the three-dimensional cameras can use a built-in red laser to inspect three-dimensional variations and overall board variances. In some embodiments, the motor uses a timing belt to drive the carriage along the rail assembly. Once the scan is complete, all image data is sent to the controller (contained in the electronics cabinet 402) for analysis.

Figure 5:
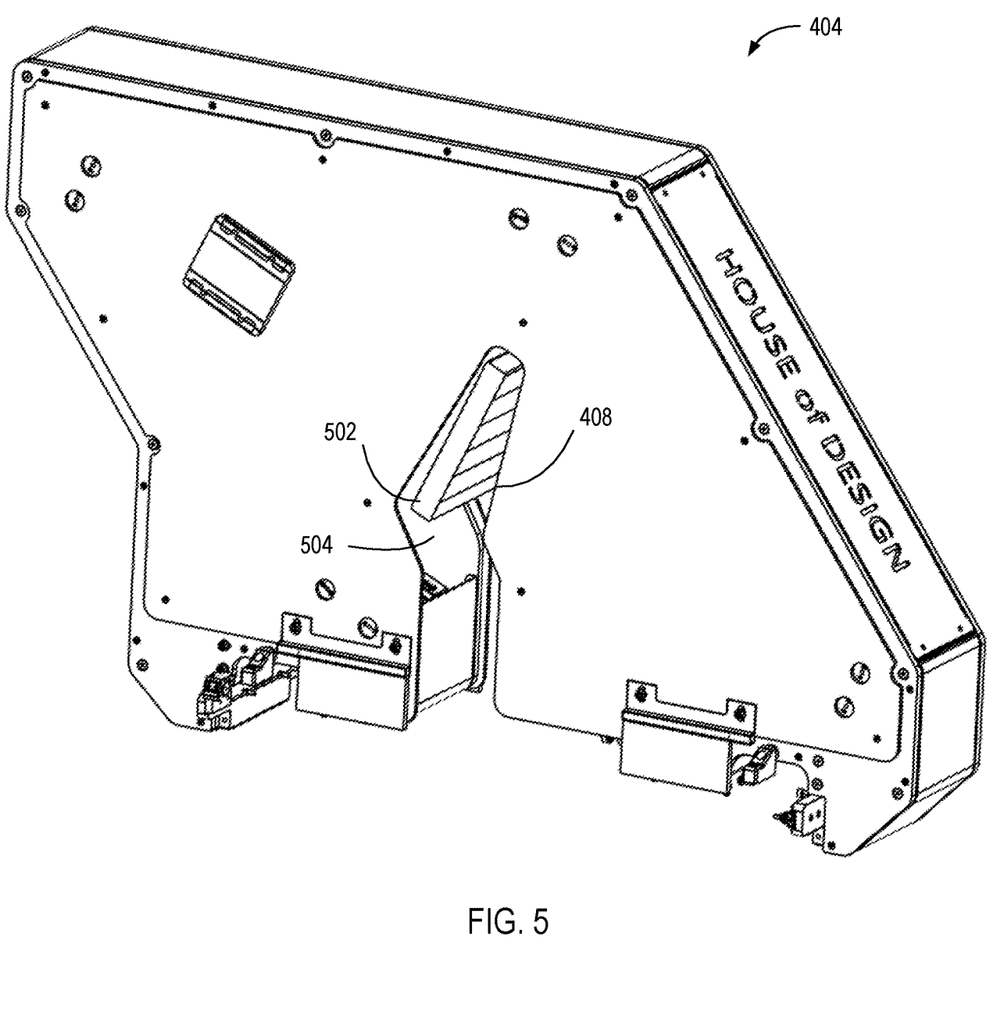
FIG. 5 is a perspective view of the carriage of the scanning system in FIG. 4.

FIG. 5 is a perspective view of the carriage 404 of the scanning system in FIG. 4. As shown, the carriage 404 comprises a housing with an aperture 408. The aperture 408 extends through the proximal and distal walls of the carriage 404 and is configured to allow the carriage 404 to pass over a structural member such as a board of wood 502. The aperture 408 extends from a first point within the housing through a bottom edge. The interior edges of the aperture 408 may be open to the inside of the carriage such that an interior 504 of the carriage 404 is exposed within the aperture. In some embodiments, the interior edges of the aperture may include a clear material, such that the interior 504 is visible but not exposed.

Figure 6:
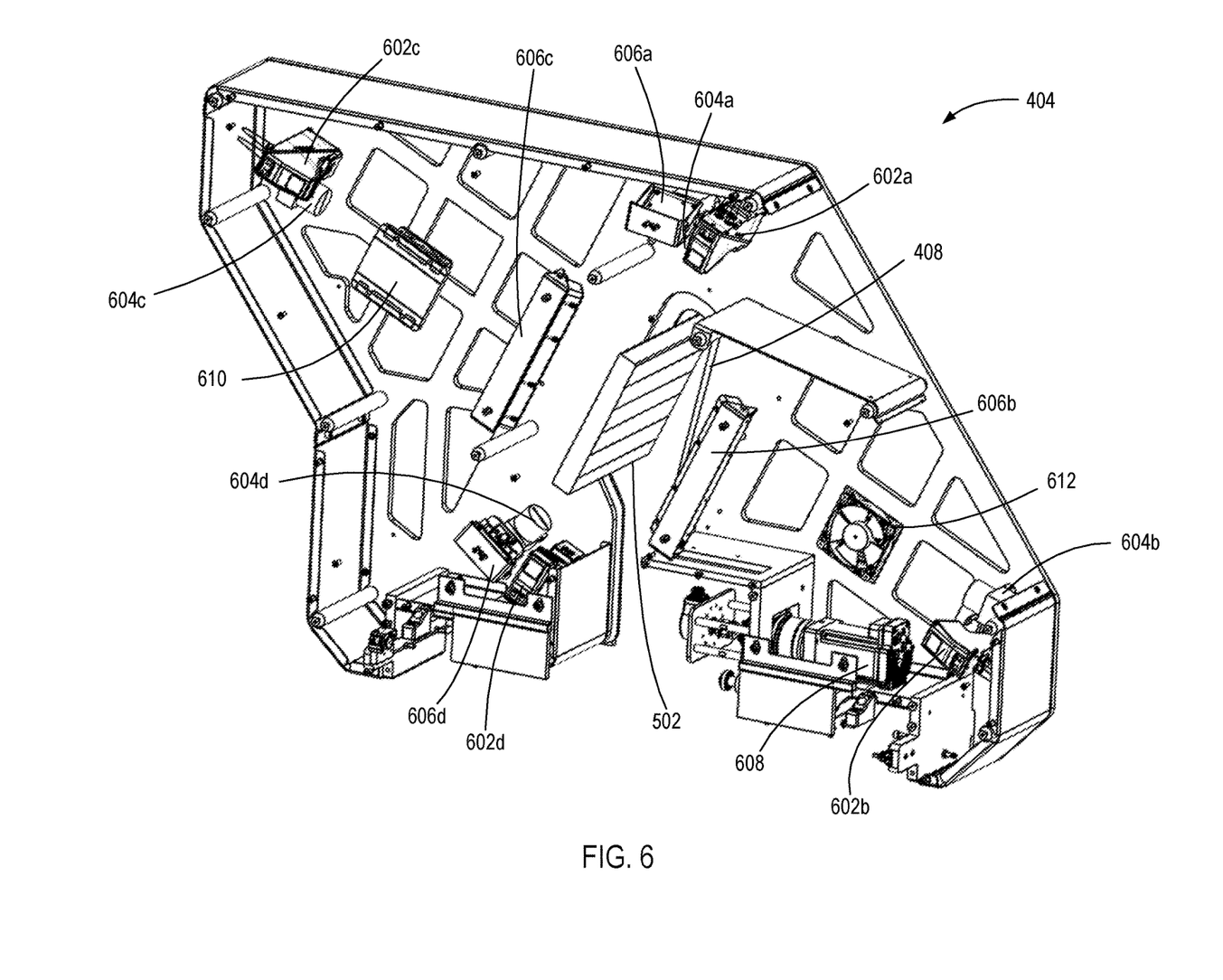
FIG. 6 is a cross-sectional perspective view of the carriage of FIG. 5.

FIG. 6 is a cross-sectional perspective view of the carriage 404 of FIG. 5. The carriage 404 includes a plurality of image capture devices, lighting, and a conveyance device 608. The carriage 404 is configured to be propelled by the conveyance device 608 along a length of a structural member such as a board of wood 502. An aperture 408 in a middle portion of the carriage 404 allows the carriage 404 to surround a portion of the board of wood 502 as the carriage 404 moves. One or more fans (e.g., a first fan 612 and a second fan 610) may circulate air within the carriage 404.

The image capture devices collect image data on the portion of the board of wood 502 surrounded by the carriage 404. As the carriage 404 moves, the image capture devices sequentially capture image data of a plurality of segments of the board of wood 502. In some embodiments, the image capture devices may be positioned to capture each side of the board of wood 502. For example, the image capture devices may comprise a first two-dimensional camera 602a to capture two-dimensional image data of an upper edge of the board of wood 502, a second two-dimensional camera 602b to capture two-dimensional image data of a first face of the board of wood 502, a third two-dimensional camera 602c to capture two-dimensional image data of a second face of the board of wood 502, and a fourth two-dimensional camera 602d to capture two-dimensional image data of a bottom edge of the board of wood 502. In some embodiments, the image capture devices may comprise a first three-dimensional camera 604a to capture three-dimensional image data of an upper edge of the board of wood 502, a second three-dimensional camera 604b to capture three-dimensional image data of a first face of the board of wood 502, a third three-dimensional camera 604c to capture three-dimensional image data of a second face of the board of wood 502, and a fourth three-dimensional camera 604d to capture three-dimensional image data of a bottom edge of the board of wood 502.

In some embodiments, the image capture devices may comprise a combination of three-dimensional and two-dimensional cameras. In the illustrated embodiment, the image capture devices comprise four three-dimensional cameras and four two-dimensional cameras. The data from the different camera types may be used to identify different defects the wood. For example, a processing unit may receive the two-dimensional image data and determine the presence of splits and knots in the board of wood 502. In some embodiments, artificial intelligence may be trained to identify the splits and knots in the two-dimensional image data. A processing unit may receive the three-dimensional image data and determine if the board of wood 502 features a bow, twist, cup, crook, or wane. Additionally, the processing units may determine the degree, size, or amount of these defects and compare the size or amount to a target specification to determine if the board of wood 502 should be used or discarded, and if used what position the board of wood 502 should be placed in for processing by downstream equipment.

The lighting may illuminate the section of the board of wood 502 within the aperture 408. The lighting may include four light devices directed with one light device directed at each side of the board of wood 502. For example, in the illustrated embodiment, the lighting includes a first infrared light 606a to illuminate an upper edge of the board of wood 502, a second infrared light 606b to illuminate a first face of the board of wood 502, a third infrared light 606c to illuminate a second face of the board of wood 502, and a fourth infrared light 606d to illuminate a bottom edge of the board of wood 502. The lighting may be angled 15 degrees relative to an image capture device capturing image data of the same side of the board of wood 502.

The conveyance device 608 may comprise a motor and an encoder. The motor may move the carriage 404 along one or more rails. The encoder may track speed and positioning of the carriage 404. A processor may correlate the two-dimensional image data, the three-dimensional image data and the speed and positioning of the carriage to determine a position of defects in the board of wood 502 detected using the image data.

Figure 7:
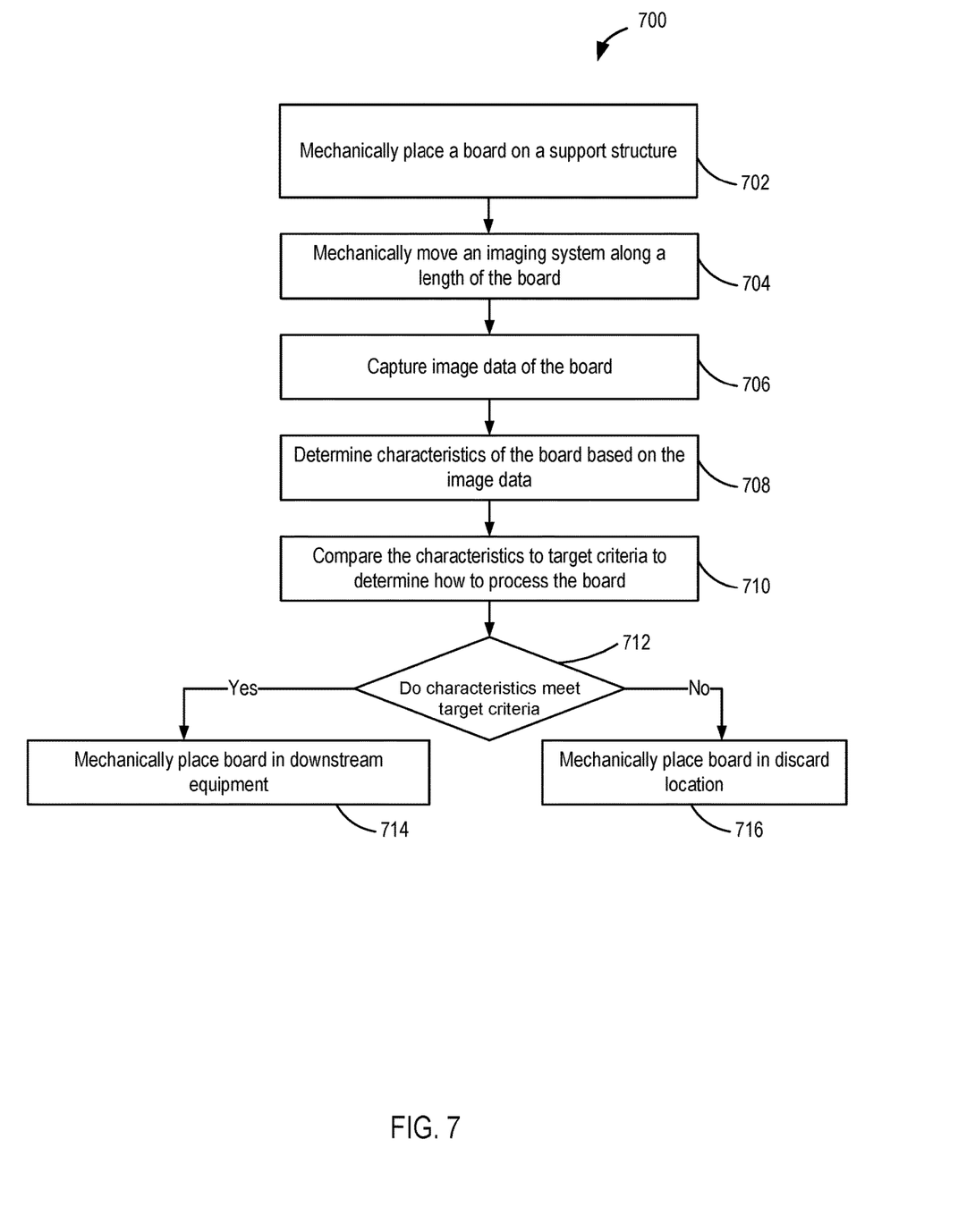
FIG. 7 is a flowchart of a method of operation of the lumber culling system of FIG. 1, according to some embodiments.

FIG. 7 is a flowchart illustrating a method 700 of operating the lumber culling system 100 of FIG. 1, according to some embodiments. The method includes mechanically placing 702 a board on a support structure comprising an angled surface and a datum surface. For example, a robot may move the board from a supply bunk to the support structure. A motor may mechanically move 704 an imaging system along a length of the board. The imaging system captures 706 image data of the board via the imaging system. In some embodiments the image data comprises two-dimensional and three-dimensional information about each side of the board at one or more segments along the length of the board.

A processor may determine 708 characteristics of the board based on the image data. For example, a processor may receive the two-dimensional image data and determine the presence of splits and knots in the board. In some embodiments, artificial intelligence may be trained to identify the splits and knots in the two-dimensional image data. A processor may receive the three-dimensional image data and determine if the board features a bow, twist, cup, crook, or wane. The processor compares 710 the characteristics to target criteria and determines 712 if the characteristics meet the target criteria to determine how the board should be processed. If the characteristics do not meet the target criteria, the method 700 includes mechanically placing 716 the board in a discard location. If the characteristics meet the target criteria, the method 700 includes mechanically placing 714 the board into a downstream equipment.

In some embodiments, the method 700 may further include moving the imaging system along the board, wherein the imaging system is positioned radially around a longitudinal axis of the board when moving along the board.

In some embodiments capturing image data of the board comprises sequentially capturing image data of a plurality of segments of the board.

In some embodiments, the method 700 may further include combining the image data of the plurality of segments of the board to generate a model of the board.

In some embodiments, the method 700 may further include tracking a position of the imaging system.

Figure 8:
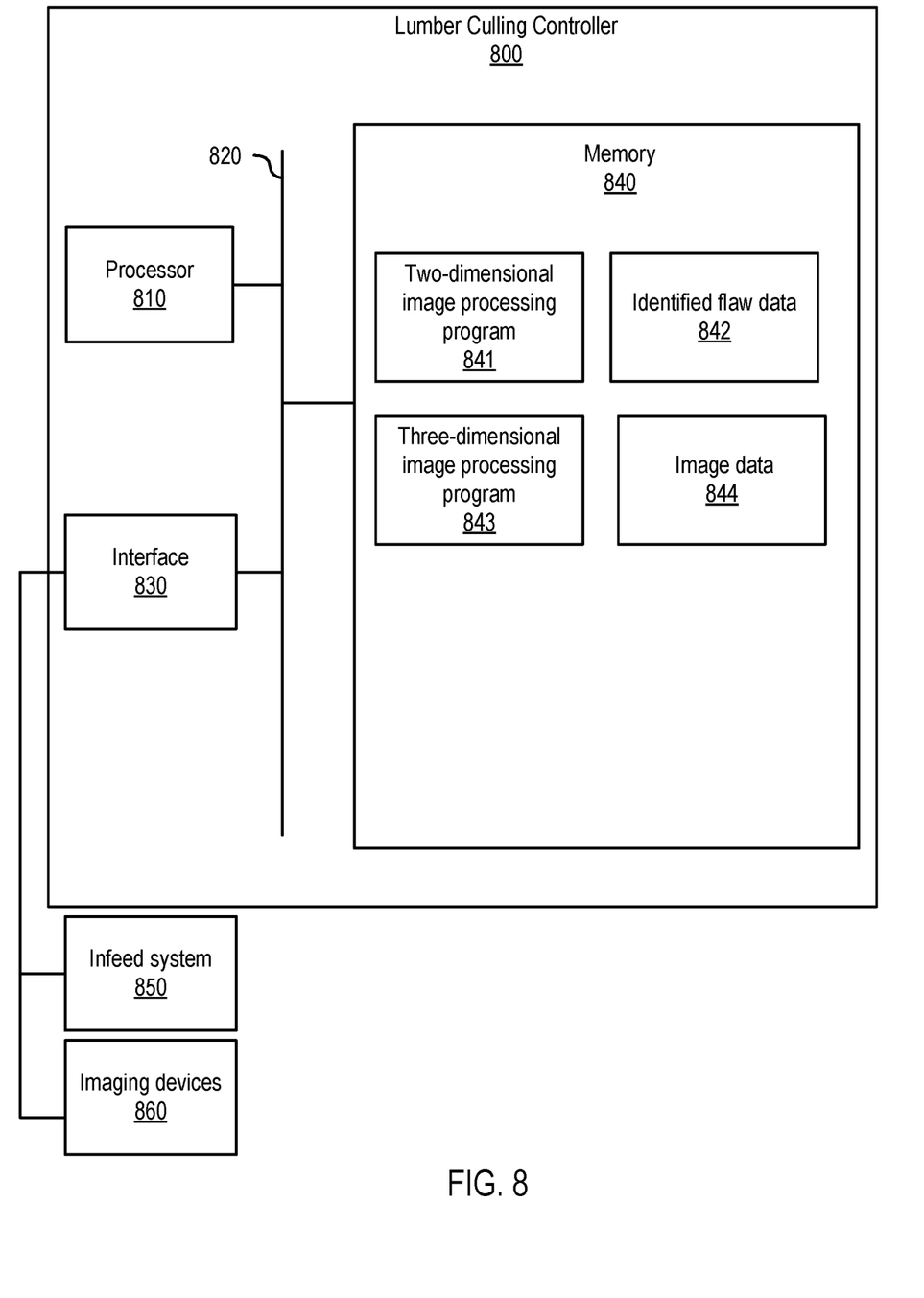
FIG. 8 is a block diagram of a lumber culling controller, which may be housed in an electronics cabinet of FIG. 4.

FIG. 8 is a block diagram of a lumber culling controller 800 which may be housed in the electronics cabinet 402 of FIG. 4. The lumber culling controller 800 may comprise a processor 810, a memory 840, and an interface 830. A bus 820 may interconnect various integrated and/or discrete components. The interface 830 may facilitate an interconnection between the lumber culling controller 800 and other devices such as the infeed system 850 and the imaging devices 860. These components may allow the lumber culling controller 800 to identify flaws in a structural member based on image data and determine how to process the structural member.

The processor 810 may include one or more general purpose devices, such as an Intel®, AMD®, or other standard microprocessor. The processor 810 may include a special purpose processing device, such as ASIC, SoC, SiP, FPGA, PAL, PLA, FPLA, PLD, or other customized or programmable device. The processor 810 may perform distributed (e.g., parallel) processing to execute or otherwise implement functionalities of the presently disclosed embodiments.

The memory 840 may include static RAM, dynamic RAM, flash memory, one or more flip-flops, ROM, CD-ROM, DVD, disk, tape, or magnetic, optical, or other computer storage medium. The memory 840 may store image data 844 from imaging devices 860, and programs to process the image data 844 (e.g., two-dimensional image processing program 841, and three-dimensional image processing program 843). In some embodiments, the memory may also store a catalog of previously identified flaw data 842 that may be used by one or both of the image processing programs to identify flaws in a structural member. The memory 840 may be local to the lumber culling controller 800, as shown, or may be distributed and/or remote relative to the lumber culling controller 800.

When the processor 810 executes the image processing programs, the lumber culling controller 800 determines flaws in the structural member based on the image data 844. For example, the processor 810 may receive two-dimensional image data and execute the two-dimensional image processing program 841 to determine the presence of splits and knots in the structural member. In some embodiments, the two-dimensional image processing program 841 may use artificial intelligence trained to identify the splits and knots in the two-dimensional image data using the catalog of previously identified flaw data 842. The processor 810 may receive the three-dimensional image data and determine if the structural member features a bow, twist, cup, crook, or wane based on the height of the board at points along the length and width of the board.

The structural member can be inspected for variations in overall three-dimensional shape including width, length, and height, and includes inspection for cracks, holes, knots that do not sit flush with the surface, wane and warping of any kind. These three-dimensional measurements are compared against a set of pre-defined criteria that dictate whether the board is within the needed requirements to be used in downstream equipment. If a board is too warped, has large knots, or has holes or cracks in the wrong spots, it can be rejected by the lumber culling controller 800 and the lumber culling controller 800 may instruct the infeed system or other robot to place the board into a "culled" or "scrap" location.

Likewise, the two-dimensional image is scanned to find any superficial, cosmetic or visual defects. These include knots flush with the surface, cracks, or other cosmetic defects that affect how well the board will function in its intended use. Artificial intelligence software (e.g., two-dimensional image processing program 841) may be used to find many defects that traditional vision systems might overlook. Artificial intelligence may be powerful enough to determine the difference between knots and grain, or even textured knots that may not be easily visible to the human eye. Using this intelligent software allows for better protection of equipment against boards that may cause trouble downstream.

The processor 810 compares the characteristics to target criteria and determines if the characteristics meet the target criteria to determine how the structural member should be processed. If the characteristics do not meet the target criteria, the processor 810 transmits a signal to the infeed system 850 to place the structural member in a discard location. If the characteristics meet the target criteria, the processor 810 transmits a signal to the infeed system 850 to place the structural member into a downstream equipment.

In some embodiments, the processor 810 may also determine an orientation for the structural member in the downstream equipment, based on the size, location, and number of flaws. In some embodiments, the processor 810 may instruct the infeed system to rotate the structural member around the vertical axis or longitudinal axis of the structural member based on identified flaws. For example, if the length of the structural member is greater than the desired length by six inches, and a knot is on a first end of the structural member, the processor 810 may determine that the infeed system 850 should rotate the structural member around its vertical axis so that the end with the knot is cut off when the structural member is trimmed down to size by downstream equipment.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "couple," and any other variation thereof are intended to cover a physical connection, an electrical connection, a magnetic connection, an optical connection, a communicative connection, a functional connection, and/or any other connection.

Embodiments herein may include various engines, which may be embodied in machine-executable instructions to be executed by a general-purpose or special-purpose computer (or another electronic device). Alternatively, the engine functionality may be performed by hardware components that include specific logic for performing the function(s) of the engines, or by a combination of hardware, software, and/or firmware.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc., that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

It will be obvious to those having skill in the art that many changes may be made to the details of the above-described embodiments without departing from the underlying principles of the invention. The scope of the present invention should, therefore, be determined only by the following claims.

The invention claimed is:

1. A lumber scanning system comprising:
a housing comprising:
a distal wall and a proximal wall spaced apart from one another to form an interior of the housing, and
an aperture extending through the distal wall and the proximal wall, wherein the aperture is sized and shaped to allow a board of wood to pass through the distal wall and the proximal wall, and wherein the interior of the housing is visible within the aperture;
imaging equipment disposed within the interior of the housing and arranged to scan a portion of each side of the board of wood that is positioned within the aperture; and
a conveyance to move the housing to pass the aperture along and thereby scan a length of the board of wood;

wherein the board of wood is supported by a plurality of spaced datum members comprising an angled surface and a datum surface to support the board of wood in a known position for a duration of the scan.

2. The system of claim 1, further comprising lighting arranged to illuminate the portion of each side of the board of wood within the aperture.

3. The system of claim 1, wherein the imaging equipment comprises a plurality of two-dimensional cameras positioned to capture optical image data of the portion of each side of the board of wood within the aperture.

4. The system of claim 3, further comprising a processing unit to:
identify characteristics of the board of wood based on the optical image data, the characteristics including one or more of texture, knots, cracks, and grain; and
compare the characteristics to target criteria to determine how the board of wood should be processed,
wherein if the characteristics do not meet the target criteria, the processing unit indicates that the board of wood is to be discarded, and
wherein if the characteristics meet the target criteria, the processing unit indicates that the board of wood is to be used.

5. The system of claim 4, wherein if the processing unit indicates the board of wood is to be used, the processing unit is further to:
determine an orientation of the board of wood for downstream equipment based on flaws.

6. The system of claim 1, wherein the imaging equipment comprises four three-dimensional cameras positioned to capture three-dimensional image data of the portion of each side of the board of wood within the aperture.

7. The system of claim 6, further comprising a processing unit to:
generate a height map based on the three-dimensional image data captured by the four three-dimensional cameras;
determine flaws in the board of wood based on the height map and the three-dimensional image data, wherein the flaws comprise one or more of warping, holes, cracks, and wane;
compare the flaws to target criteria to determine how the board of wood should be processed,
wherein if the flaws do not meet the target criteria, the board of wood is to be discarded, and
wherein if the flaws meet the target criteria, the board of wood is to be used; and
determine, if the flaws meet the target criteria, an orientation of the board of wood for downstream equipment based on the flaws.

8. The system of claim 1, wherein the imaging equipment comprises a plurality of three-dimensional cameras and a plurality of two-dimensional cameras.

9. The system of claim 1, further comprising an encoder to track speed and position of the housing.

10. The system of claim 9, wherein the conveyance comprises:
one or more rails; and
a motor to move the housing along the one or more rails.

11. A lumber culling system comprising:
a carriage comprising:
a housing with an aperture sized and shaped to receive boards, and imaging sensors to capture image data of a board passing through the aperture;
a conveyance to cause movement of the carriage relative to the board;
a plurality of spaced datum members, wherein a transport to move and position boards places the board on the plurality of spaced datum members, and wherein the spaced datum members comprise an angled surface to support the board in a known position; and
processing circuitry in electrical communication with the carriage and the transport, the processing circuitry to:
identify characteristics of the board based on the image data,
compare the characteristics to target criteria to determine how the board should be processed,
transmit, if the characteristics do not meet the target criteria, a signal instructing the transport to place the board in a discard location, and
transmit, if the characteristics meet the target criteria, a signal instructing the transport to place the board into a downstream equipment.

12. The system of claim 11, wherein the transport comprises a robotic arm configured to move and position boards.

13. The system of claim 11, wherein the processing circuitry is further to:
determine, if the characteristics meet the target criteria, an orientation of the board of wood for the downstream equipment based on the characteristics of the board; and
wherein when the signal instructing the transport to place the board into the downstream equipment comprises indication of the orientation.

14. The system of claim 11, wherein the conveyance comprises:
a motor to move the housing along one or more rails; and
an encoder to track a speed and position of the housing.

15. A method for culling lumber with a scanning system comprising:
mechanically placing, using a transport, a board on a plurality of spaced support structures comprising an angled surface and a datum surface, the spaced support structures supporting the board in a known position;
mechanically moving an imaging system along a length of the board;
capturing image data of the board via the imaging system, wherein the image data comprises two-dimensional and three-dimensional information about each side of the board at one or more segments along the length of the board;
determining characteristics of the board based on the image data;
comparing the characteristics to target criteria to determine how the board should be processed; and
if the characteristics do not meet the target criteria, mechanically placing the board in a discard location, and
if the characteristics meet the target criteria, mechanically placing the board into a downstream equipment.

16. The method of claim 15, further comprising moving the imaging system along the board, wherein the imaging system is positioned radially around a longitudinal axis of the board when moving along the board.

17. The method of claim 15, wherein capturing image data of the board comprises sequentially capturing image data of a plurality of segments of the board.

18. The method of claim 17, further comprising combining the image data of the plurality of segments of the board to generate a model of the board.

19. The method of claim 18, further comprising tracking a position of the imaging system.

\* \* \* \* \*